(12) United States Patent
Russell et al.

(10) Patent No.: US 8,727,399 B2
(45) Date of Patent: May 20, 2014

(54) DEVICE FOR PREVENTION OF DOOR OPENING DURING ROLL-OVER

(75) Inventors: Stephen Russell, Plain City, OH (US); Christopher Mampe, Delaware, OH (US); Kenichi Kitayama, Dublin, OH (US); Masatoshi Mori, Columbus, OH (US); Kenneth M Hartlaub, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1118 days.

(21) Appl. No.: 12/606,591

(22) Filed: Oct. 27, 2009

(65) Prior Publication Data
US 2011/0095546 A1 Apr. 28, 2011

(51) Int. Cl.
*E05C 3/06* (2006.01)

(52) U.S. Cl.
USPC .................. 292/216; 292/336.3; 292/DIG. 22

(58) Field of Classification Search
USPC .................. 292/336.3, DIG. 22, DIG. 65, 216
See application file for complete search history.

(56) References Cited

U.S. PATENT DOCUMENTS

| | | | |
|---|---|---|---|
| 4,382,622 A | 5/1983 | Ishikawa | |
| 4,995,654 A * | 2/1991 | Nishigami et al. | 292/216 |
| 5,101,597 A | 4/1992 | Pelachyk et al. | |
| 6,565,134 B1 | 5/2003 | Stuart et al. | |
| 6,880,867 B2 | 4/2005 | Schoen et al. | |
| 7,036,857 B2 | 5/2006 | Ichino | |
| 7,111,880 B2 * | 9/2006 | Saitoh | 292/336.3 |
| 7,387,321 B2 | 6/2008 | Tanaka et al. | |
| 8,235,451 B2 * | 8/2012 | Jordan et al. | 296/146.1 |
| 8,387,311 B2 * | 3/2013 | Heller | 49/503 |
| 2003/0122401 A1 * | 7/2003 | Hashimoto | 296/190.11 |
| 2007/0024068 A1 * | 2/2007 | Wood | 292/336.3 |
| 2007/0069532 A1 | 3/2007 | Tenorio et al. | |
| 2007/0120382 A1 | 5/2007 | Chevalier | |
| 2011/0163554 A1 * | 7/2011 | Patel | 292/216 |

FOREIGN PATENT DOCUMENTS

JP 2005330689 12/2005

OTHER PUBLICATIONS

International Search Report of PCT/US2010/048756 dated Nov. 15, 2010.
Written Opinion of PCT/US2010/048756 dated Nov. 15, 2010.

* cited by examiner

*Primary Examiner* — Mark Williams
(74) *Attorney, Agent, or Firm* — Rankin Hill & Clark LLP

(57) ABSTRACT

A door assembly for a vehicle comprises a vehicle door having an outside door panel, and a handle that is moveably mounted to the vehicle door. A latch actuator is operatively connected to the handle. Movement of the handle moves the latch actuator to an open position to allow opening of the door. An internal door part is connected to the outside door panel. The internal door part includes a contact area internally offset from the outside door panel. A counterbalancing member is cooperatively associated with the handle. During a crash condition causing deformation of the door and intrusion of the handle, the counterbalancing member engages the contact area of the internal door part to prevent the handle from moving the latch actuator to the open position.

20 Claims, 6 Drawing Sheets

DEVICE FOR PREVENTION OF DOOR OPENING DURING ROLL-OVER

BACKGROUND

Exemplary embodiments herein relate to a door opening prevention device for preventing a vehicle door from accidentally opening during an impact, particularly during a vehicle dynamic roll-over event causing deformation of the vehicle door.

Manual operation of a door latch of a vehicle is usually through the use of a door handle connected by a cable or link rod to a latch actuator. Safety standards generally require that vehicle doors do not open accidentally upon impact of the vehicle, or, for example, if the vehicle rolls or spins following a side impact. To prevent the door handle from opening the door during a crash condition, one known approach has been to provide a counterweight or counterbalance adjacent the door handle. The counterweight acts on movement of the door handle to prevent the door handle from opening the door during or after vehicle impact. Typically, the counterweight is rotationally coupled to the door handle using a spring arrangement, so that inertial movement of the door handle is countered by corresponding inertial movement of the counterweight, in the event of abnormal accelerations of the vehicle. Due to the normal orientation of door handles on a vehicle, this would normally be relevant when the vehicle suffers a side impact. One problem with known counterweight designs is that during a vehicle roll-over event causing deformation of the door handle, the inertia of the mass of the counterweight may be insufficient to prevent the door from opening.

Alternative solutions have included providing the latch actuator with internal inertia-responsive levers or other components, so that the latch actuator is locked against opening movements when the latch actuator experiences undue acceleration in a specific predetermined axis. These arrangements introduce complexity and cost into the latch actuators, and moreover, by their very nature, they cannot be incorporated retrospectively into latch actuators of existing design.

SUMMARY

According to one aspect, a door assembly for a vehicle comprises a vehicle door having an outside door panel, and a handle that is moveably mounted to the vehicle door. A latch actuator is operatively connected to the handle. Movement of the handle moves the latch actuator to an open position to allow opening of the door. An internal door part is connected to the outside door panel. The internal door part includes a contact area internally offset from the outside door panel. A counterbalancing member is cooperatively associated with the handle. During a crash condition causing deformation of the door and intrusion of the handle, the counterbalancing member engages the contact area of the internal door part to prevent the handle from moving the latch actuator to the open position.

According to another aspect, a door handle assembly comprises a handle moveably mounted on a vehicle door. A latch actuator is operatively connected to the handle. A link rod operatively connects the handle and the latch actuator. Movement of the handle moves the link rod which causes the latch actuator to stroke to an open position to allow opening of the door. A counterweight is operatively coupled between the handle and the link rod for activating the link rod in response to movement of the handle. The counterweight is operative to prevent the handle from stroking the door open during a crash condition imparting a sudden generally high deceleration on the vehicle door. A stopper is cooperatively associated with the counterweight. The stopper is configured to contact an interior vehicle body part to limit intrusion of the handle and prevent the handle from stroking the door open during an impacting crash condition.

According to yet another aspect, a door opening operation prevention device is provided for a vehicle door handle assembly. The door handle assembly includes a bracket for installation in a vehicle door, a handle moveably supported on the bracket, a counterweight supported on the bracket for rotation in response to movement of the handle, and a latch actuator. A link rod connects the handle and the latch actuator. Movement of the handle moves the link rod which causes the latch actuator to stroke to an open position to allow opening of the door. The door opening operation prevention device comprises a stopper coupled to the counterweight for rotation therewith. At least a portion of the stopper projects outwardly from the counterweight and away from the handle to minimize a swing clearance between the counterweight and a surrounding vehicle body part. The stopper is configured to engage the surrounding vehicle body part to limit intrusion of the handle and to prevent the handle from stroking the door open during an impacting crash condition.

DETAILED DESCRIPTION

Figure 1:
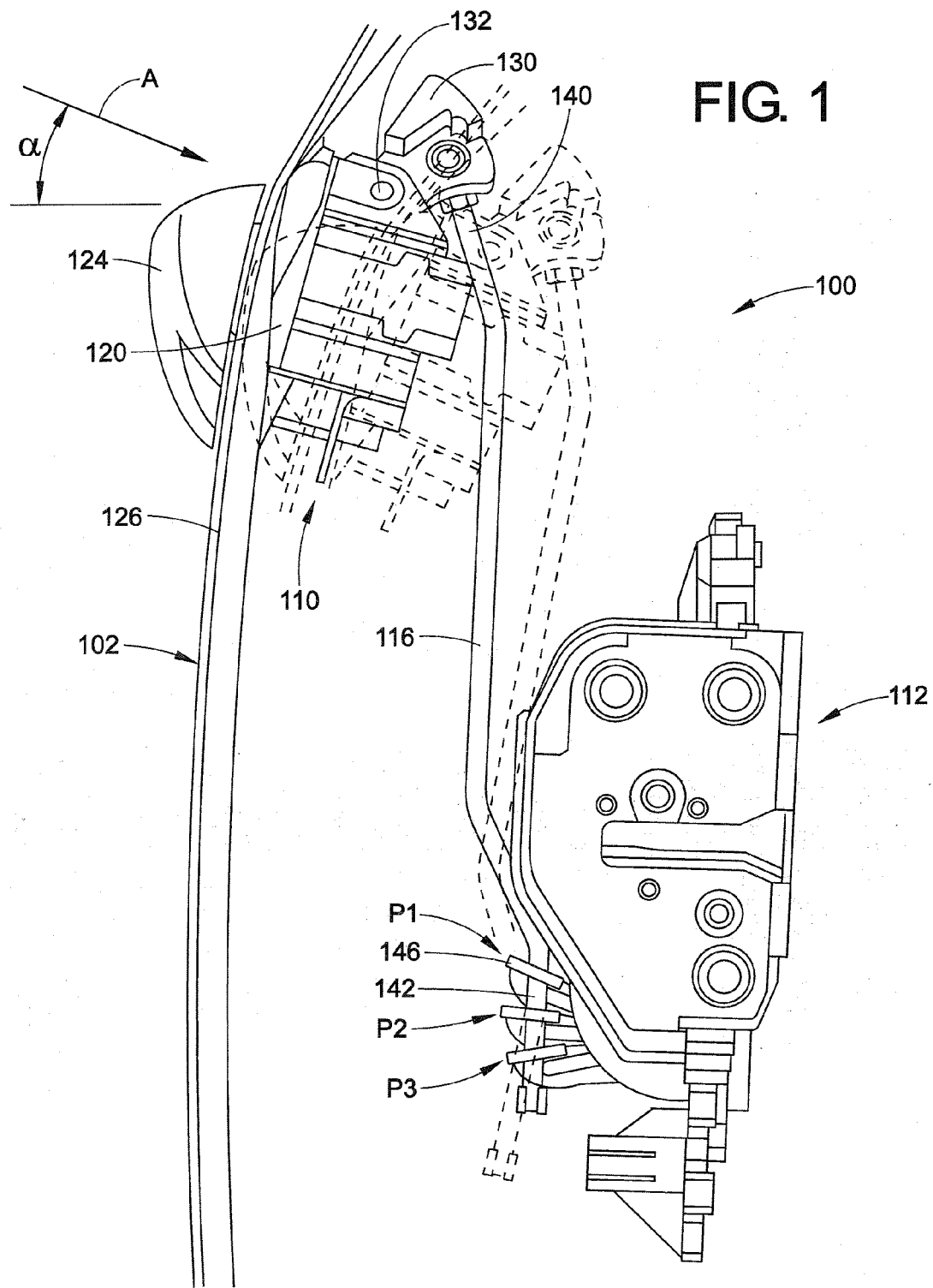
FIG. 1 is a side schematic view of a vehicle door handle assembly installed in a door of a vehicle, the door handle assembly including a handle portion and a latch actuator operatively connected to the handle portion. The dashed lines of FIG. 1 showing movement of the door handle assembly during a vehicle crash condition, such as a side impact.
Figure 2:
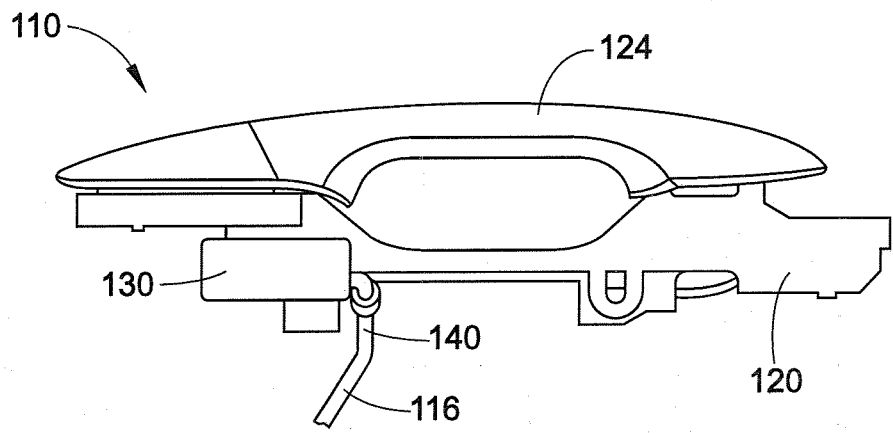
FIG. 2 is a top elevational view of the handle portion of the door handle assembly of FIG. 1.
Figure 3:
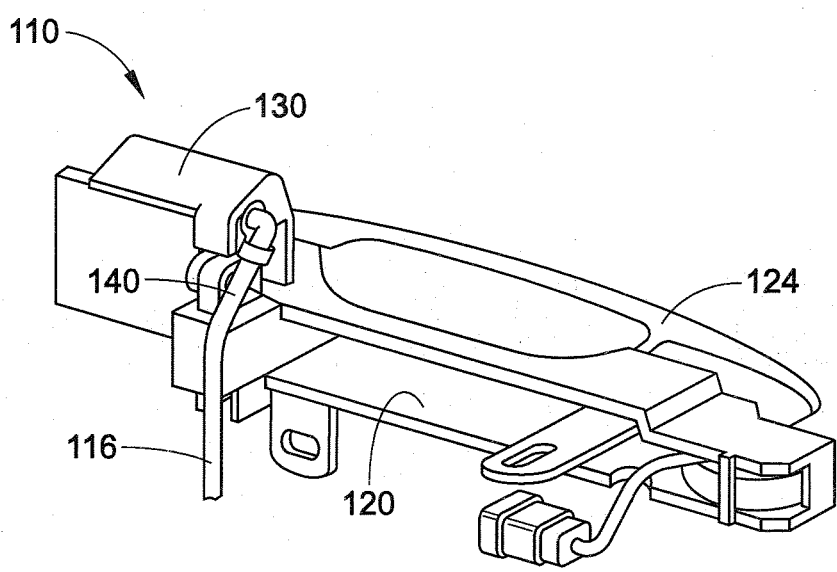
FIG. 3 is a perspective view of the handle portion of FIG. 2.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 depict a vehicle door handle assembly 100 securely installed in a door 102 of a vehicle. The vehicle door 102 is a well known conventional component of the vehicle and will not be discussed or illustrated in detail herein. The door handle assembly generally comprises a handle portion 110 and a latch actuator 112 operatively connected to the handle portion via a release cable or link rod 116.

As shown, the handle portion 110 includes a mounting bracket 120 and a handle 124. The mounting bracket 120 is configured and dimensioned to be mounted within the interior of the door 102 and is typically fixed to an inside surface of an outside door panel 126 of the door 102 in a conventional manner, such as mechanical fasteners (not shown). The handle 124 is moveably coupled to the mounting bracket 120 between a closed or latching position and an open or latch release position. A portion of the handle 124 is located inside the door 102 and a portion of the handle is located outside the door 102 adjacent to the outside door panel 126. Of course, other mounting arrangements could be provided. For example, the handle portion 110 can be mounted directly to the outside door panel 126 without the use of a bracket (e.g., bracket 120).

The vehicle door handle assembly 100 is configured and arranged to prevent the door 102 from being inadvertently opened due to a side vehicular impact. To this extent, a counterweight 130 is operatively connected to the handle 124. In normal use, the counterweight activates the link rod 116 in response to movement of the handle 124 to open the door 102. The counterweight 130 acts on movement of the door handle 124 to prevent the handle 124 from stroking the vehicle door open during a vehicle crash condition. A spring arrangement, such as a coil spring (not visible) mounted on a pivot bar 132 (FIG. 1), generally interconnects the counterweight 130 and the handle 124 rotationally so that inertial movement of the door handle 124 is countered by corresponding inertial movement of the counterweight 130, in the event of abnormal accelerations of the vehicle. Thus, with the counterweight 130, excessive acceleration of the vehicle about the longitudinal axis of the vehicle does not have the effect of moving the handle 124.

The door handle portion 110 is connected to the latch actuator 112 by the link rod 116. When pulled, the handle 124 moves the link rod 116 that in turn activates the door latch actuator 112. Particularly, a first end section 140 of the link rod 116 is secured to the counterweight 130. A second end section 142 of the link rod 116 is coupled to an actuation lever 146 of the latch actuator 112. With specific reference to FIG. 1, the actuation lever 146 typically has a closed position P1, a latch open portion P2 and a latch full stroke position P3. As the handle 124 is moved to the open position, the counterweight 130 rotates about the pivot bar 132, which in turn causes downward movement or stroking of the link rod 116 and movement of the lever 146 from the closed position P1 to the latch open position P2. Generally, with the depicted latch actuator 112 and according to one exemplary embodiment, about 13.5 mm of stroke of the link rod 116 is required to move the lever 146 from the closed position P1 to the latch open position P2 to, in turn, move the latch actuator 112 to the open position to allow opening of the door 102. Of course, other arrangements are possible with varying stroke lengths.

With the door handle assembly 100, if a mass impacts the vehicle door 102, the force of the impact and deceleration of the impacting mass could cause the handle 124 to move to the open position and cause the door 102 to open. The counterweight 130 on the handle 124 usually only works in events where there is little intrusion by the impacting mass and there is high deceleration imparted on the vehicle door 102. The counterweight 130 is typically not helpful in events where there is high intrusion on the handle 124 and the high amount of intrusion causes the door to open due to stroke of the door latch actuator 112. For example, and as shown in FIG. 1, during a crash condition, such as a vehicle roll-over event, the handle portion 110 can deform due to lateral impact on the door handle assembly 100. This intrusion of the handle portion 110 (shown in the dotted lines of FIG. 1) can move the handle portion 110 towards the latch actuator 112. Movement of the handle portion 110 could stroke the link rod 116, which in turn moves the lever 146 towards the latch full stroke position P3.

Particularly, a mass impacting the handle portion 110 at a direction shown at arrow A which is at an angle of intrusion α, e.g. about 27°, can displace the handle portion 110 inwardly. Other angles of intrusion, e.g. higher than about 27°, can also displace the handle portion 110 inwardly. In one example, at a displacement of about 30 mm, the handle portion 110 causes the link rod 116 to stroke about 14 mm which exceeds the 13.5 mm of stroke required to move the lever 146 from the closed position P1 to the latch open position P2. Therefore, in the case of lateral impact of the door handle assembly 100, the inertia of the door handle 124 effectively lifts the handle 124, the effective motion of the handle 124 resulting in movement or stroking of the link rod 116 and actuation of the door latch actuator 112. This creates the potential of a number of undesirable situations during an accident such as an occupant of the vehicle being ejected; the door 102 opening and then closing on an occupant's arm or leg; accident debris being projected into the vehicle interior; etc.

Figure 4:
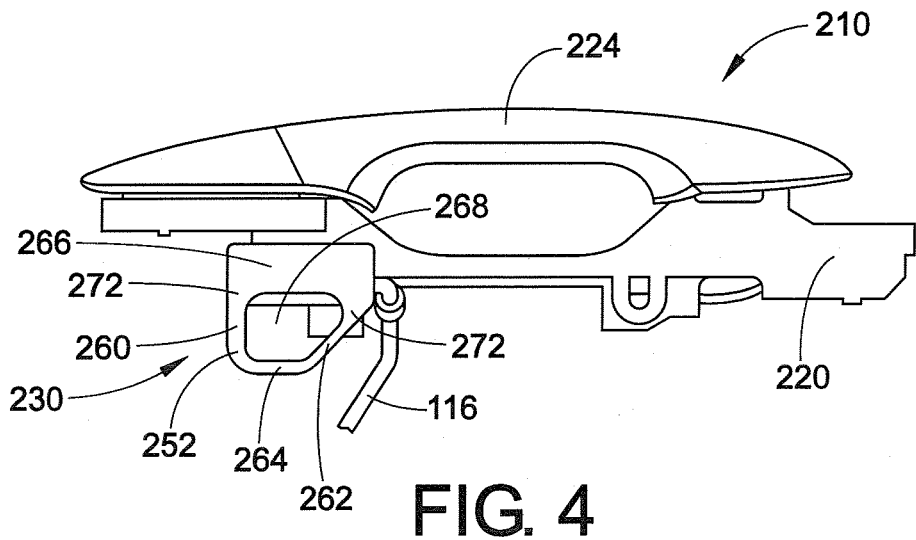
FIG. 4 is a top elevational view of a handle portion including an exemplary counterbalancing member for the door handle assembly of FIG. 1.
Figure 5:
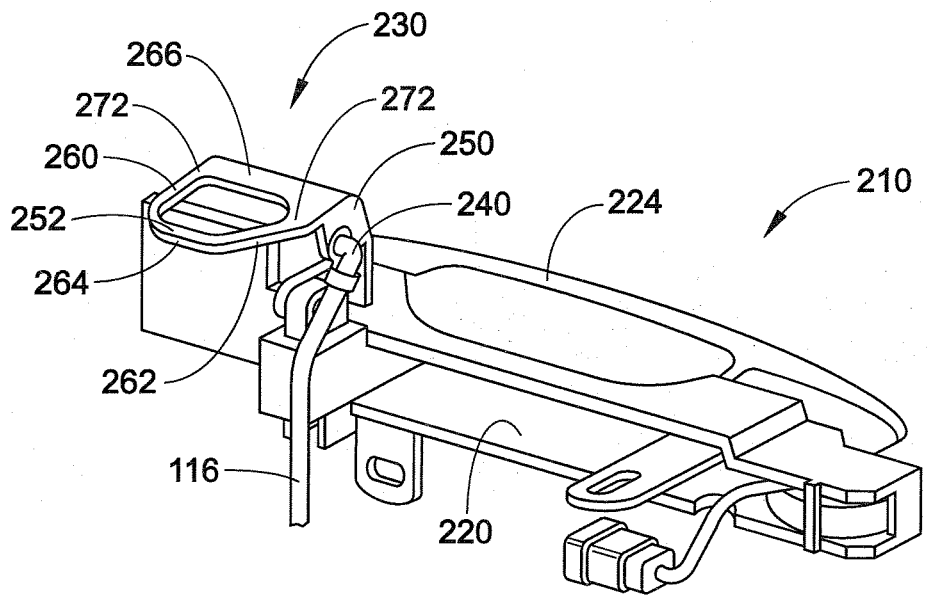
FIG. 5 is a perspective view of the handle portion of FIG. 4.

With reference to FIGS. 4 and 5, the exemplary door handle assembly is configured and arranged to prevent the door 102 from being inadvertently opened due to a crash condition causing high intrusion of the handle assembly. Similar to door handle assembly 100, door handle assembly comprises a handle portion 210 including a bracket 220 configured and dimensioned to be installed in the vehicle door 102. A handle 224 is moveably mounted on the bracket 220. Alternatively, the handle portion 210 can be mounted directly to the outside door panel 126 (FIG. 1) without the use of bracket 220 or some other mounting arrangement could be employed. A latch actuator (not shown), such as latch actuator 112 (FIG. 1), is operatively connected to the handle 224. A link rod, such as link rod 116 (FIG. 1), operatively connects the handle and the latch actuator. Movement of the handle 224 moves the latch actuator 124 to the latch open position to allow opening of the door.

An exemplary counterbalancing member 230 is cooperatively associated with the handle 224. Similar to counterweight 130, the counterbalancing member 230 is operatively coupled between the handle 224 and the link rod 116 for activating the link rod in response to movement of the handle. As shown, an end section 240 of the link rod 116 is secured to the counterbalancing member 230. A spring arrangement (not visible) can rotationally interconnect the counterbalancing member 230 and the handle 224. In normal use, the counterbalancing member 230 activates the link rod 116 in response to movement of the handle 224 to open the door 102. During a crash condition that imparts a sudden, generally high deceleration of the vehicle door 102, the counterbalancing member 230 is operative to prevent the handle 224 from stroking the door 102 open. Particularly, inertial movement of the door handle 224 is countered by corresponding inertial movement of the counterbalancing member 230. The counterbalancing member 230 is also configured to engage a contact area of a surrounding or adjacent interior vehicle body part 246, which is internally offset from the outside door panel 126, to prevent the handle 224 from moving the latch actuator 112 to the open position during a crash condition causing deformation of the door 102 and intrusion of the handle portion 210. The interior vehicle body part 246 can be an internal door part, such as a window sash (FIGS. 8 and 9).

The counterbalancing member 230 includes a counterweight 250 and an extension or stopper 252 coupled to and projecting outwardly from the counterweight 250 away from the handle 224 and toward the vehicle body part 246. The counterweight 250 is generally similar to counterweight 130. The stopper 252 includes first and second arm members 260, 262 and a cross member 264 spanning between the first and second arm members 260, 262. As will be discussed in greater detail below, the cross member 264 is configured to be at least partially deformable due to engagement with the vehicle body part 246 during a crash condition. The stopper 252 further includes a base member 266, the first and second arms 260, 262 being connected to the base member 266. In the depicted embodiment, the first arm 260 extends generally perpendicularly from the base member 266 and the second arm 262 extends angularly from the base member 266 towards the first arm; although, this is not required. The first and second arm members 260, 262, the cross member 264 and the base member 266 define an opening 268 surrounded by the members 260, 262, 264 and 266. This configuration of the stopper 252, e.g. by removing material from the stopper, can allow the stopper to deform upon impact with vehicle body part 246.

Figure 6:
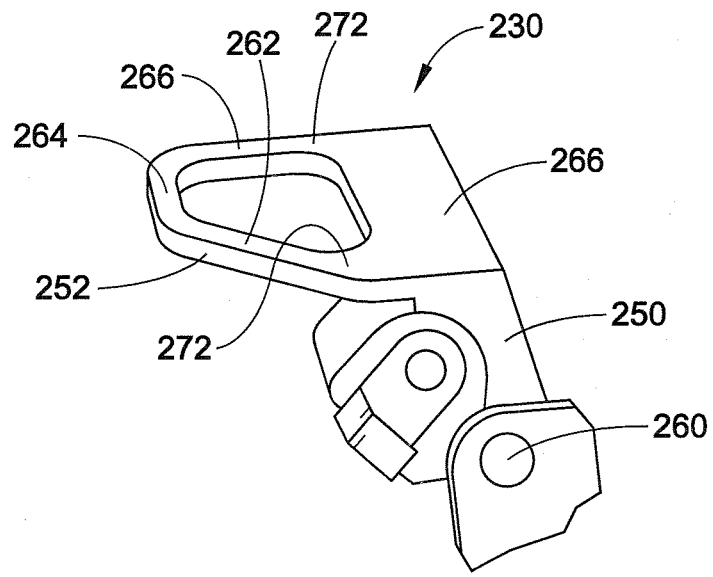
FIG. 6 is a perspective view of the counterbalancing member of the handle portion of FIG. 4.
Figure 7:
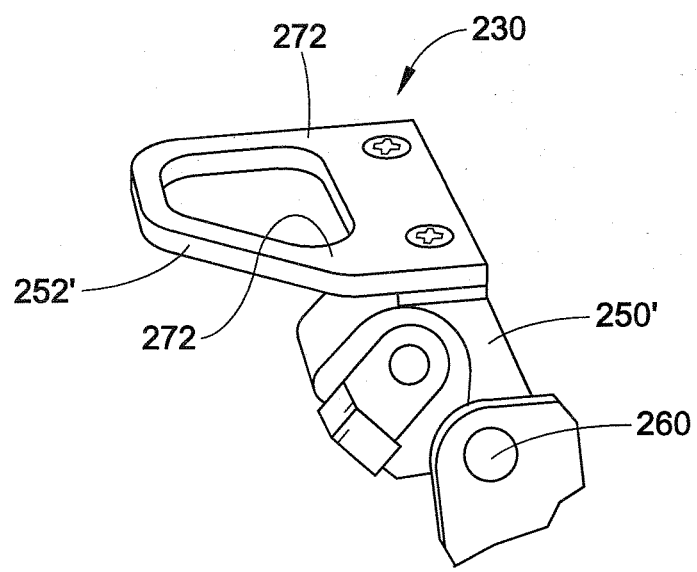
FIG. 7 is a perspective view of another exemplary counterbalancing member of the handle portion of FIG. 4.

As shown in FIGS. 4-6, the base member 266 of the stopper 252 is integrally formed with the counterweight 250 as a unitary member. Alternatively, as shown in FIG. 7, the stopper 252' is a separate component mounted to a top surface of the counterweight 250' via conventional fasteners. With this exemplary embodiment of the stopper 252', the stopper 252' can be incorporated retrospectively into vehicle door handle assemblies of existing design, such as door handle assembly 100. In both exemplary embodiments of the counterbalancing member, the counterweight 250, 250' has a first length and the counterweight together with the stopper 252, 252' has a second length that is about twice the first length. This positions the counterbalancing member 230 in close proximity to the vehicle body part 246.

Figure 8:
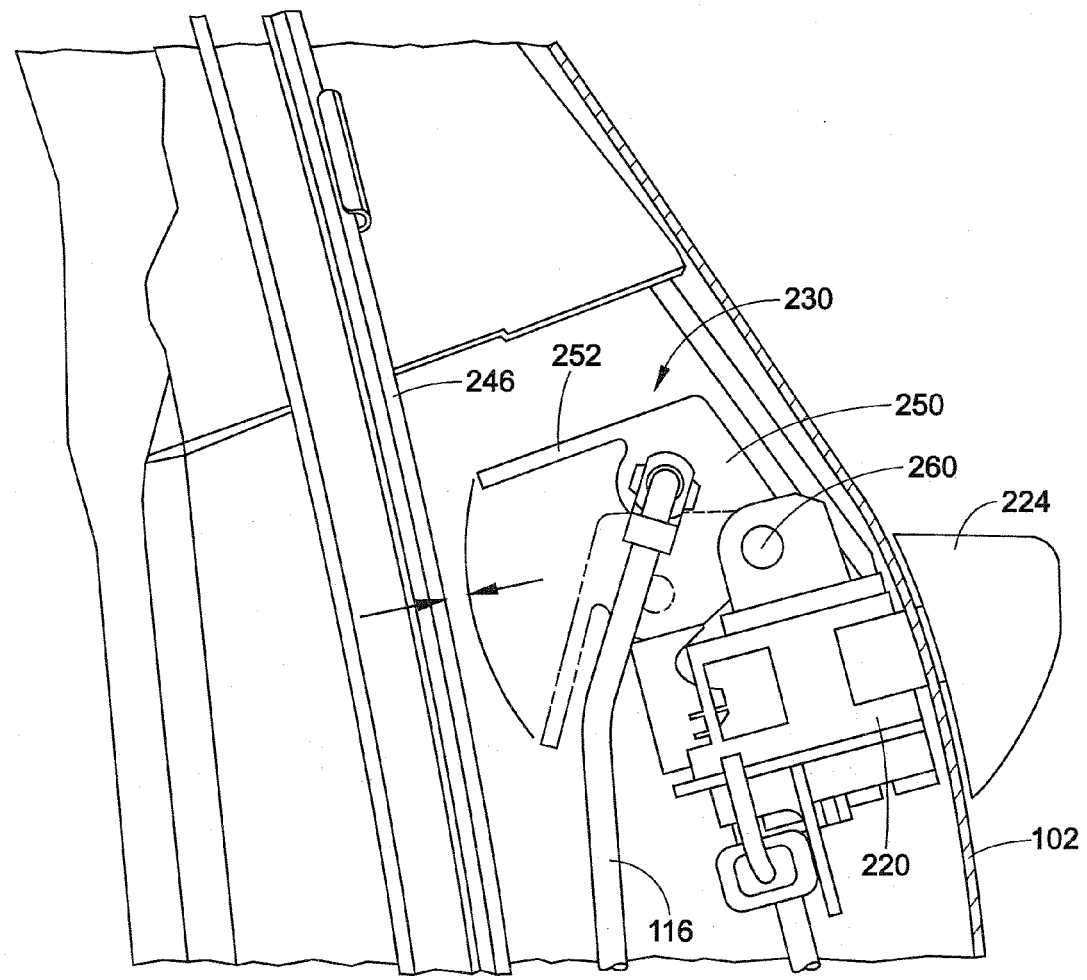
FIG. 8 is a side schematic view of the handle portion of FIG. 4 installed in a door of a vehicle.
Figure 9:
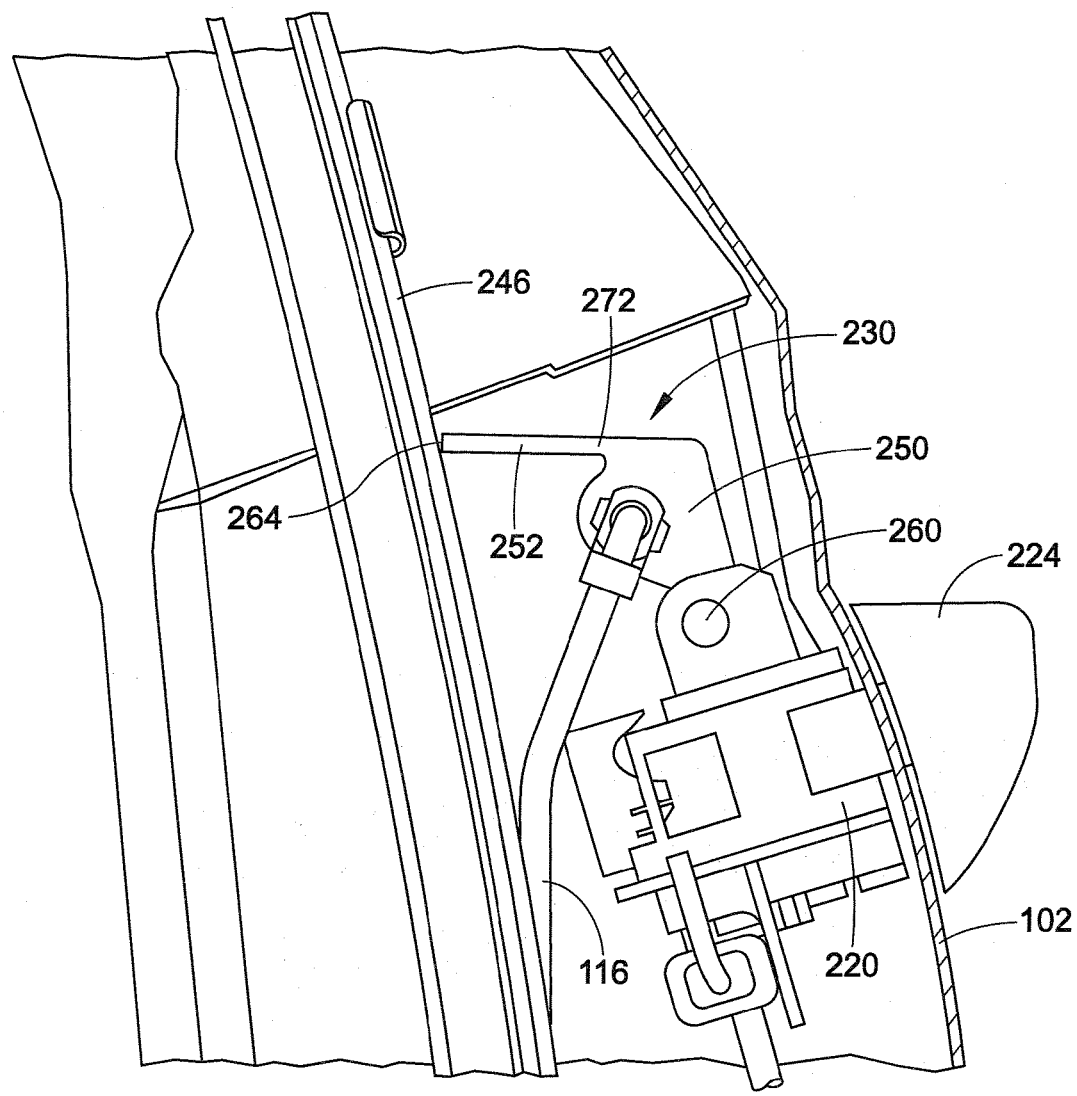
FIG. 9 is a side schematic view of the handle portion of FIG. 8 showing movement of the handle portion during a vehicle crash condition, such as a side impact.

With reference now to FIGS. 8 and 9, the counterweight 250 together with the extension or stopper 252 are pivotally supported on the bracket 220 for rotation relative to the bracket in response to movement of the handle 224 to activate the latch actuator 112 (not shown). Particularly, rotation of the counterweight 250 and stopper 252 about a pivot rod 260 moves the link rod 116 towards the latch actuator 112 to stroke the latch actuator to the open position to allow opening of the vehicle door 102. As shown, the stopper 252 is arranged to provide a predetermined minimum swing clearance with respect to the vehicle body part 246. In the depicted embodiment, a swing clearance between the vehicle body part 246 and the cross member 264 (i.e., an end of the stopper 252) is about 5 mm.

As indicated previously, during a crash condition, such as a vehicle roll-over event, an impacting mass on or in close proximity to the door handle 224 can cause deformation of the door 102 and intrusion of the handle 224. With the door handle assembly 100, the intruding peripheral vehicle part, such as the handle portion 110, could move the handle 124 to the open position and cause the door 102 to open. With the exemplary counterbalancing member 230, the stopper 252 is configured to engage the vehicle body part 246 (FIG. 9) to limit intrusion of the handle 224 and prevent incidental movement and activation of the link rod 116 independent of the operation of the door handle 224 during the crash condition.

Particularly, during a crash condition, a mass impacting the handle 224 can under certain conditions sometimes displace the handle inwardly. This intrusion of the handle 224 moves the handle towards the latch actuator 112. As indicated previously with the door handle assembly 100, in one example, displacement of the handle portion 110 about 30 mm inwardly causes the link rod 116 to stroke about 14 mm downwardly which exceeds the 13.5 mm of stroke required to move the lever 146 of the latch actuator 112 from the closed position P1 to the latch open position P2. In comparison, the intruding handle 224 also causes the link rod 116 to stroke; however, at a handle displacement of about 10 mm for example, the stopper 252 contacts the vehicle body part 246.

As shown in FIG. 9, the engagement of the stopper 252 with the vehicle body part 246 creates a counterforce causing the link rod 116 to at least partially raise relative to the bracket 220. With continued displacement of the handle 224, the counterbalancing member 230 at least partially deforms due to engagement of the cross member 264 with the vehicle body part 246. More particularly, the opening 268 (FIG. 4) in the stopper 252 can provide a weakened section or sections at locations 272 where the respective first and second arm members 260, 262 connect with the base member 266. Accordingly, the stopper 252 can bend at these locations resulting in rotation (per the embodiment of FIG. 9) of the counterbalancing member 230 and, therefore, upward movement of the link rod 116. At a handle displacement of about 30 mm, for example, the stopper 252 can break allowing the link rod 116 to again stroke. However, with the exemplary counterbalancing member 230, at a similar handle displacement or even a higher handle displacement (e.g., 45 mm), the link rod 116 strokes less than an amount needed to actuate the latch actuator 112. Thus, the counterbalancing member 230 prevents the intruding handle 224 from stoking the vehicle door 102 open (i.e., prevents the latch actuator 112 from reaching the open position) during an impacting crash condition.

As is evident from the foregoing, the exemplary door handle assembly is configured to prevent the vehicle door 102 from opening during a dynamic roll over event. The extension 252 is configured to limit travel of the counterweight 250 towards the occupant during the roll over event by engaging the intruding peripheral vehicle part 246. This travel limitation prevents the handle 224 and latch actuator 112 from reaching an opening position, and subsequently opening the door.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A door assembly for a vehicle, the door assembly comprising:
   a vehicle door having an outside door panel;
   a handle assembly including a handle moveably mounted to the vehicle door;
   a latch actuator operatively connected to the handle, wherein movement of the handle moves the latch actuator to an open position to allow opening of the door;
   an internal door body part connected to the outside door panel, the internal door body part including a contact area internally offset from the outside door panel;
   a counterbalancing member cooperatively associated with the handle, wherein during a crash condition causing deformation of the vehicle door and intrusion of the handle toward the internal door body part, the counterbalancing member engages the contact area of the internal door body part to prevent the handle from moving the latch actuator to the open position, wherein the counterbalancing member is configured to at least partially deform due to engagement with the internal door body part.

2. The door assembly of claim 1, wherein the counterbalancing member includes a counterweight and an extension projecting toward the internal door body part.

3. The door assembly of claim 2, further including a link rod operatively connecting the handle and the latch actuator, the counterbalancing member being operatively coupled between the handle and the link rod for activating the link rod in response to movement of the handle, the link rod moving the latch actuator to the open position.

4. The door assembly of claim 3, wherein the extension engages the internal door body part to prevent incidental movement and activation of the link rod independent of the operation of the door handle during the crash condition.

5. The door assembly of claim 4, wherein engagement of the extension with the internal door body part creates a counterforce causing the link rod to raise relative to a handle bracket thereby preventing the latch actuator from reaching the open position.

6. The door assembly of claim 2, wherein the handle assembly includes a bracket for installation in the vehicle door, wherein the counterweight together with the extension are pivotally supported on the bracket for rotation relative to the bracket in response to movement of the handle to activate the latch actuator.

7. The door assembly of claim 6, wherein prior to deformation of the door, the extension is offset from the internal door body part to provide a predetermined minimum swing clearance.

8. The door assembly of claim 2, wherein the extension is a separate component mounted to the counterweight.

9. The door assembly of claim 2, wherein the extension is integrally formed with the counterweight.

10. The door assembly of claim 1, wherein the internal door body part is window sash.

11. The door assembly of claim 1 further including a bracket connected to the outside door panel, wherein the handle is movably mounted on the bracket.

12. The door assembly of claim 1 further including a bracket for installation in the vehicle door, the handle moveably supported on the bracket, the counterbalancing member includes a counterweight supported on the bracket for rotation in response to movement of the handle, a link rod connecting the handle and the latch actuator, wherein movement of the handle moves the link rod causing the latch actuator to stroke to an open position to allow opening of the door, and a stopper coupled to the counterweight for rotation therewith, at least a portion of the stopper projecting outwardly from the counterweight and away from the handle to minimize a swing clearance between the counterweight and the interior door body part, wherein the interior door body part is a window sash, the stopper being configured to engage the window sash to limit intrusion of the handle and prevent the handle from stroking the door open during an impacting crash condition.

13. The door assembly of claim 12, wherein a portion of the stopper engaging the window sash is at least partially deformable.

14. The door assembly of claim 12, wherein the stopper is configured to move the link rod away from the latch actuator after engagement with the window sash thereby preventing the latch actuator from reaching the open position.

15. A vehicle door assembly comprising:
a vehicle door having an outside door panel and an interior door body part connected to the outside door panel, the interior door body part including a contact area internally offset from the outside door panel;
a handle moveably mounted to the vehicle door;
a latch actuator operatively connected to the handle;
a link rod operatively connecting the handle and the latch actuator, wherein movement of the handle moves the link rod causing the latch actuator to stroke to an open position to allow opening of the door;
a counterweight operatively coupled between the handle and the link rod for activating the link rod in response to movement of the handle, the counterweight being operative to prevent the handle from stroking the door open during a crash condition imparting a sudden generally high deceleration on the vehicle door; and
a stopper cooperatively associated with the counterweight, the stopper being configured to contact the interior door body part to limit intrusion of the handle and prevent the handle from stroking the door open during an impacting crash condition, the interior door body part being spaced from the handle assembly to provide a predetermined swing clearance for the stopper during normal operation of the handle assembly.

16. The door assembly of claim 15, wherein the stopper includes first and second arm members and a cross member spanning between the first and second arm members, the cross member being deformable due to engagement with the vehicle body part.

17. The door assembly of claim 16, wherein the stopper is integrally formed with the counterweight as a unitary member.

18. The door assembly of claim 16, wherein the stopper further includes a base member, the base member being secured to the counterweight.

19. The door assembly of claim 15, wherein the stopper is configured to move the link rod away from the latch actuator after engagement of the stopper with the vehicle body part thereby preventing the latch actuator from reaching the open position.

20. The door assembly of claim 15, wherein the counterweight together with the stopper are supported on a bracket installed in the vehicle door for rotation relative to the bracket in response to movement of the handle, rotation of the counterweight and stopper moving the link rod towards the latch actuator to stroke the latch actuator to the open position.

* * * * *